United States Patent
Matthews et al.

(10) Patent No.: US 6,244,094 B1
(45) Date of Patent: *Jun. 12, 2001

(54) CLOSED LOOP CALIBRATOR AND PROCESS OF CALIBRATING A LIQUID METERING DEVICE IN A CLOSED ATMOSPHERE

(75) Inventors: John Matthews; Ashley Tillotson, both of Cumming, GA (US)

(73) Assignee: The Lubrizol Corporation, Wickliffe, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,684

(22) Filed: Aug. 28, 1998

(51) Int. Cl.[7] .................................................... G01F 25/00
(52) U.S. Cl. ............................................. 73/1.74; 73/1.36
(58) Field of Search .................................. 73/1.05, 1.74, 73/1.36

(56) References Cited

U.S. PATENT DOCUMENTS

| | | | |
|---|---|---|---|
| 1,202,511 | 10/1916 | Groff | 73/332 |
| 1,515,746 | 9/1922 | Norman . | |
| 2,979,389 | 4/1961 | Blount et al. | 48/195 |
| 3,479,874 | 11/1969 | Lukas et al. | 73/292 |
| 3,508,432 | * 4/1970 | Marshall, Jr. et al. | 73/1.74 X |
| 4,504,281 | 3/1985 | Williams et al. | 48/195 |
| 5,197,322 | * 3/1993 | Indravudh | 73/1.74 |
| 5,251,785 | * 10/1993 | Hayden et al. | 222/1 |
| 5,351,036 | 9/1994 | Brown et al. | 340/618 |
| 5,756,883 | * 5/1998 | Forbes | 73/1.74 X |

FOREIGN PATENT DOCUMENTS 0328762   9/1988  (EP) .

* cited by examiner

Primary Examiner—Thomas P. Noland
(74) Attorney, Agent, or Firm—Michael F. Esposito

(57) ABSTRACT

A closed loop calibrator and process for calibrating a liquid metering device in a closed atmosphere such that the liquid being metered is not exposed to the atmosphere. In one embodiment, a calibrator is disclosed which comprises a body member containing a calibration chamber, and first and second fluid passage within the body member in spaced relationship to the calibration chamber, where when the first fluid passage is connected to a device to be calibrated and the second fluid passage is connected to a container, a closed system is formed having no exposed passages to the atmosphere. Additionally, the first fluid passage is in fluid communication with a lower end of the calibration chamber, and both the first and the second fluid passage are in fluid communication with an upper end of the calibration chamber.

11 Claims, 2 Drawing Sheets

CLOSED LOOP CALIBRATOR AND PROCESS OF CALIBRATING A LIQUID METERING DEVICE IN A CLOSED ATMOSPHERE

FIELD OF THE INVENTION

The present invention relates to a closed loop calibrator, and a process for calibrating a liquid metering device in a closed environment using a graduated chamber without exposing the liquid being metered to the atmosphere.

BACKGROUND OF THE INVENTION

Calibration devices, such as liquid level devices, also known as "sight gauges" or "sight glasses," have been used in the past to calibrate liquid in a particular device being calibrated. Such calibration devices typically include a window interposed between a cover clamped to a chamber. The window allows visual inspection of the level of liquid in the chamber. The gauge can be fastened to a wall of the chamber or connected in parallel piping to a pipe or conduit. Graduations on the outer surface of the liquid level gauge around the window indicate the level of liquid within the liquid level device, and hence, within the device being calibrated.

However, heretofor, such calibration devices did not provide a closed environment for calibrating liquid metering devices, such that the liquid being metered is not exposed to the atmosphere. This is particularly desirable when calibrating a liquid metering device, such as an injector, used to additize fluids, for example, natural gas, propane or liquefied petroleum gas (LPG), with a liquid stenching agent, such as ethyl mercaptan, in that it is imperative that such a liquid stenching agent is not released to the atmosphere.

SUMMARY OF THE INVENTION

The present invention relates to a closed loop calibrator and calibration process conducted in a closed system that provides a way of calibrating a liquid metering device in a closed environment using a graduated chamber without exposing the liquid being metered to the atmosphere.

The closed loop calibrator of the present invention is structured such that an outlet of a liquid metering device, such as an injector, can be connected to the inlet of the closed loop calibrator of the present invention, and the outlet of the closed loop calibrator of the present invention can be connected to a storage tank, resulting in a closed environment under which the calibration process is conducted.

In accordance with one aspect of the present invention, the closed loop calibrator includes a body member having a pair of fluid passages in space relation to a calibration chamber wherein one of the fluid passages has a pair of spaced apart side ports in fluid communication with opposite ends of the chamber, and an inlet at its lower end, located at the lower end of the body member, connected to a device to be calibrated. The other fluid passage has a side port in fluid communication with the upper end of the chamber and an outlet at its lower end located at the lower end of the body member, connected to a container, such as a storage tank.

In accordance with another aspect of the invention, the fluid passages are in fluid communication with each other through a valve in a cross passage in the body member located below the chamber.

In accordance with another aspect of the present invention, the closed loop calibrator provides for calibrating a liquid metering device, such as an injector, by connecting the device to the inlet of the closed loop calibrator, and connecting a container, such as a storage tank, to the outlet of the closed loop calibrator, without exposing the liquid of the liquid metering device to the atmosphere as the calibration process is conducted.

To the accomplishment of the foregoing and related ends, the invention, then, comprises the features here and after fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
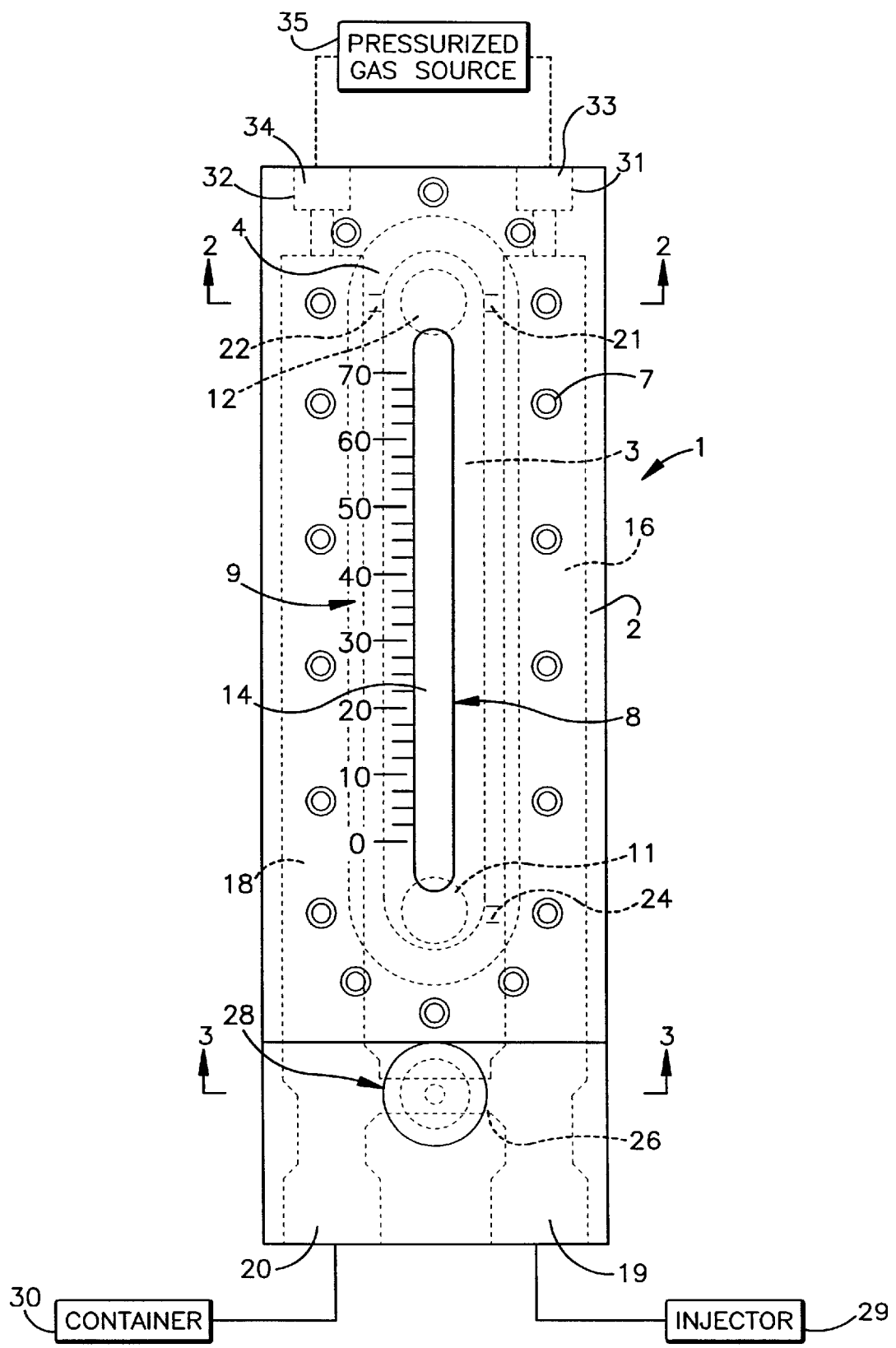
FIG. 1 is a schematic illustration of the front side of a closed loop calibrator according to the present invention.
Figure 2:
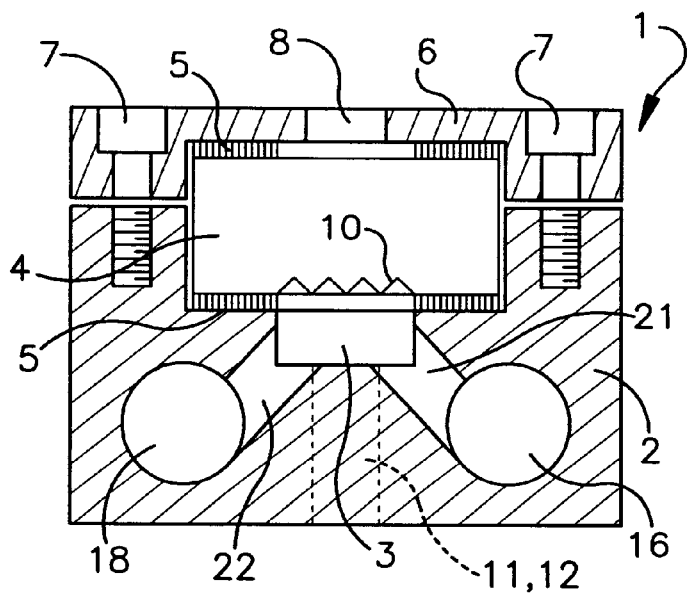
FIGS. 2 and 3 are schematic transverse sections through the closed loop calibrator of FIG. 1 on the plane of the lines 2—2 and 3—3, respectively.

Referring now in detail to the drawings, and initially to FIGS. 1 and 2, there is schematically shown a closed loop calibrator 1 according to the present invention for calibrating a liquid metering device without exposing the liquid being metered to the atmosphere as described hereafter.

The closed loop calibrator 1 is preferably, for example, 16 inches long, 2½ inches in width, and 2⅛ inches in depth, and includes a body member 2, preferably made of, for example, stainless steel, containing a relatively small volumetric calibration chamber 3. The calibration chamber 3 is preferably, for example, 13 inches long, ⅝ inch wide, and ½ inch deep, enclosed by a high pressure glass plate 4, preferably, for example, 1½ inches wide and 13½ inches long. An optional add-on volumetric pot (not shown) can be connected to ports 11 and 12 located on the backside of calibrator 1 to enlarge the capacity of calibration chamber 3, if desired (see FIGS. 1 and 2). Ports 11 and 12 are in fluid communication with calibration chamber 3 when connected to calibration chamber 3. These ports are connected to calibration chamber 3 before the calibration process is begun. Ports 11 and 12 are sealed with suitable plugs (not shown) when not connected to the volumetric pot.

The high pressure glass plate 4 is secured in place by a cover 6, and is sealed all the way around the edges of calibration chamber 3 by a gasket material 5, which is made of a suitable material, for example, grafoil. The cover 6 is made of a suitable material, for example, stainless steel, which is placed over high pressure glass plate 4 and secured to body member 2 using a series of bolts 7 of a quantity necessary to secure fitting, preferably twenty six in number.

Extending through cover 6, in line with volumetric calibration chamber 3 and glass plate 4 is a sight window 8 having indicia adjacent the length thereof, forming a graduated scale 9, that allows visual inspection of the amount of liquid within the calibration chamber 3. Lens surface 10 on the back side of high pressure glass plate 4 reflects light to show the shadow of liquid 14 within calibration chamber 3. At the upper end of body member 2 are top ports 31, 32 in fluid communication with fluid passages 16, 18, respectively. For illustrative purposes, the numeric numbers 0 through 70 in FIG. 1 represent the numeric value of the graduated scale 9. For example, fluid 14 is shown at a level of 65 cc on the graduated scale in FIG. 1.

The body member 2 also contains a pair of fluid passages 16, 18 extending substantially the entire length of body member 2 in parallel spaced relation on each side of calibration chamber 3.

One of the passages 16 has a calibrator inlet or fill connection 19 at the lower end of body member 2, whereas the other passage 18 has a calibrator outlet or drain connection 20 at the lower end of body member 2. Calibrator inlet 19 is connectable to an outlet of a liquid metering device 29, schematically shown in FIG. 1, and calibrator outlet 20 is connectable to a container, such as a storage tank 30, also schematically shown in FIG. 1, thus forming a closed system. The liquid metering device may, for example, be of the type described in U.S. Pat. No. 5,251,785, the entire disclosure of which is incorporated herein by reference.

Both fluid passages 16, 18 are in fluid communication with the upper end of calibration chamber 3 through side ports 21, 22, respectively, in body member 2, but only inlet passage 16 is in fluid communication with the lower end of calibration chamber 3 through another side port 24 adjacent such lower end.

Figure 3:
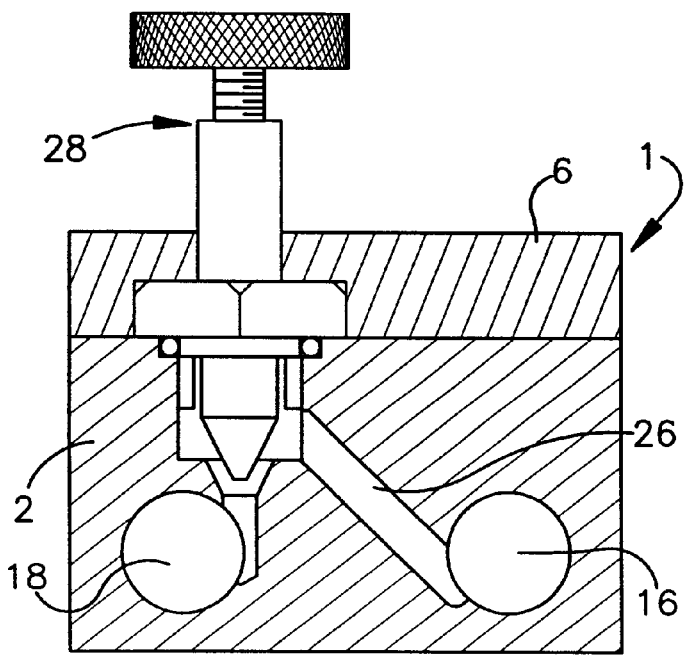

FIGS. 1 and 3 show both passages 16, 18 in fluid communication with each other through a needle valve 28 in a cross passage 26 within body member 2 below chamber 3. Cross passage 26 is used to drain chamber 3 and for setting the zero mark upon opening the needle valve 28. FIG. 3 shows the needle valve 28 partially opened.

The calibration process using the closed loop calibrator 1 according to the present invention includes connecting the outlet of a liquid metering device, for example, an injector 29, schematically shown in FIG. 1, for injecting a liquid product such as ethyl mercaptan to the inlet or fill connection 19 of closed loop calibrator 1. Drain or outlet connection 20 of the closed loop calibrator 1 is connected to a container or storage tank 30, also schematically shown in FIG. 1. The connection of inlet 19 to the liquid metering device 29, and the connection of outlet 20 to container 30 forms a closed loop system.

After the closed loop calibrator 1 is connected to the liquid metering device 29 and to the container 30, the operator verifies whether there is any liquid product in calibration chamber 3 using sight window 8 of the closed loop calibrator 1 by visual inspection. If there is liquid product in calibration chamber 3, the operator opens needle valve 28, shown in FIG. 3, to drain any liquid out of calibration chamber 3 through cross passage 26, to outlet or drain connection 20, into the container 30 connected to outlet or drain connection 20. Thereafter, the operator closes the needle valve 28.

When needle valve 28 is closed, the operator causes the liquid metering device 29 being calibrated to fill the closed loop calibrator 1 with the liquid product through inlet or fill connection 19, shown in FIG. 1, to wet down the calibrator surfaces. More specifically, as liquid product enters inlet 19 and begins to fill passage 16, the liquid product travels through side port 24, into calibration chamber 3. As liquid product fills the chamber 3 and passage 16, air is forced out through upper side ports 21 and 22 into drain passage 18. When the liquid product reaches the top of passage 16, liquid product overflows through side port 22, into passage 18 and container 30. At this point, the wet down step is complete.

Then, the operator slowly opens needle valve 28 to drain the liquid from calibration chamber 3, through side port 24 and cross passage 26 to outlet 20, but not past the zero mark on the graduated scale 9, followed by closing of needle valve 28.

Next, the operator causes the liquid metering device 29 to dispense an adequate amount of liquid into calibration chamber 3 to raise the liquid level in the sight window 8 above the zero mark, but below the full mark which may, for example, be 80 cc on the graduated scale, depending upon the volume of the calibration chamber 3.

The operator then notes the amount of liquid in sight window 8 against the indicated volume of the liquid metering device 29 and makes all the necessary adjustments, either automatically or manually, depending upon the type of injector being calibrated, and records the measurements.

After the above-described process is completed, the operator opens needle valve 28 of closed loop calibrator 1 to drain the liquid from calibration chamber 3. When needle valve 28 is opened, the fluid travels from calibration chamber 3, through lower side port 24, to fluid passage 16, then through cross passage 26, and then to outlet 20 and into the container 30. In this way, no liquid product is exposed to the atmosphere.

In the usual case, closed loop calibrator 1 will be set up to drain the liquid back to the container, such as a storage tank, by gravity, in which event the top ports 31 and 32 would be closed by suitable plugs 33 and 34, respectively (see FIG. 1). However, if closed loop calibrator 1 is not set up for gravity drain, either of the plugs 33 and 34 is removed and a source 35 of pressurized inert gas, such as nitrogen, is applied to either of the unplugged top ports 31 or 32 in body member 2, as schematically shown in phantom lines in FIG. 1, to force any liquid back out of the closed loop calibrator 1 through outlet or drain connection 20, to the storage tank 30 upon opening the needle valve 28 in the manner previously described.

From the foregoing, it will be apparent that the closed loop calibrator enables calibration of a liquid metering device using a graduated chamber without exposing the liquid being metered to the atmosphere since a closed atmosphere is formed.

Although the invention has been shown and described with respect to a certain preferred embodiment, it is obvious that equivalent alterations and modifications will occur to others skilled in the art upon the reading, and understanding of the specification. The present invention includes all such equivalent alterations and modifications, and is limited only by the scope of the claims.

In the claims:

1. A calibrator comprising:
    a body member containing a calibration chamber, and first and second fluid passage means within said body member in spaced relationship to said calibration chamber,
    said first fluid passage means being connectable to a device to be calibrated, and said second fluid passage means being connectable to a container, to form a closed system having no exposed passages to the atmosphere,
    said first fluid passage means being in fluid communication with a lower end of said calibration chamber, and said second fluid passage means being in fluid communication with an upper end of said calibration chamber, and
    wherein said first fluid passage means is also in fluid communication with said upper end of said calibration chamber.

2. The calibrator according to claim 1, wherein said first fluid passage means has a calibrator inlet at its lower end being connectable to said device to be calibrated, and said second fluid passage means has a calibrator outlet at its lower end being connectable to said container.

3. The calibrator according to claim 1, wherein said first fluid passage means is in fluid communication with said upper end of said calibration chamber through a first side port, and wherein said second fluid passage means is in fluid communication with said upper end of said calibration chamber through a second side port.

4. The calibrator according to claim 1, wherein said first passage means is in fluid communication with said lower end of said calibration chamber through a side port adjacent to said lower end.

5. The calibrator according to claim 1, further comprising:
   a cross passage in said body member located below said calibration chamber in fluid communication with said first and second fluid passage means, and valve means in said cross passage for selectively closing and opening said cross passage to fluid flow.

6. The calibrator according to claim 5, further comprising:
   top port means in said body member in fluid communication with at least one of said fluid passage means, said top port means being plugged when said calibrator is set up for gravity drain, and said top port means being unplugged and connected to a source of pressurized gas when said calibrator is not set up for gravity drain.

7. The calibrator according to claim 1, wherein said calibration chamber is enclosed by a high pressure glass plate sealed at its edges to said body member.

8. The calibrator according to claim 7, further comprising:
   a cover secured to said body member in overlying relation to said high pressure glass plate.

9. The calibrator according to claim 8, further comprising:
   a sight window extending through said cover, in line with said calibration chamber, along the length of said high pressure glass plate.

10. The calibrator according to claim 9, wherein said sight window has indicia for allowing visual inspection of the amount of liquid within said calibration chamber.

11. The calibrator according to claim 10, further comprising:
    a lens surface on said high pressure glass plate that reflects light to show the shadow of said liquid within said calibration chamber.

\* \* \* \* \*